United States Patent [19]

Yokouchi

[11] 4,412,746

[45] Nov. 1, 1983

[54] OPTICAL NONCONTACTING DETECTOR

[75] Inventor: Hirotaka Yokouchi, Muroran, Japan

[73] Assignee: The President of Muroran Institute for Technology, Hokkaido, Japan

[21] Appl. No.: 240,575

[22] Filed: Mar. 4, 1981

[30] Foreign Application Priority Data

Jul. 16, 1980 [JP] Japan .................................. 55-97375

[51] Int. Cl.³ .................... G01N 21/47; G02B 5/14
[52] U.S. Cl. .................................... 356/446; 250/227
[58] Field of Search ................ 356/445, 446, 373; 250/561, 227, 375

[56] References Cited

U.S. PATENT DOCUMENTS 3,491,240 1/1970 Vyce ................................. 356/373
3,918,814 11/1975 Weiser ............................... 356/375
4,320,442 3/1982 McCamy ........................... 356/446

OTHER PUBLICATIONS

Mechanical Engineering, Sep. 1979, pp. 27-31, The Future of Numerical Controls, M. M. Barash.

Primary Examiner—Vincent P. McGraw
Assistant Examiner—L. A. Dietert
Attorney, Agent, or Firm—Robert E. Burns; Emmanuel J. Lobato; Bruce L. Adams

[57] ABSTRACT

An optical noncontacting detector, in which the light projecting and receiving systems share a common axis and the lights of the two systems do not interfere with each other, in order to realize a higher S/N ratio and smaller size and weight than conventional ones.

11 Claims, 18 Drawing Figures

$l_d \leq 2f$ $l_d = 2f$ $l_d \geq 2f$

F-PHOTOCELL : No.22 C=39.8mm
B-PHOTOCELL : No. 2 A=42.5mm
D'=14.5-D
OUTPUT RANGE : 98mV
MAXIMUM OUTPUT : 61 mV
APPLICABLE RANGE : -2~14mm
MAXIMUM
SENSITIVITY : 10mV/mm

OPTICAL NONCONTACTING DETECTOR

DETAILED DESCRIPTION OF THE INVENTION

This invention relates to an optical noncontacting detector for detecting the displacement (exactly, its component in the direction of observation axis), direction of normal and configuration anisotropy (such as ridges and grooves) of the surface of an object without contacting the object. Particularly, it relates to an optical noncontacting detector that is suitable for detecting the displacement of grinding wheel surface, due to wear or altitude alteration of wheel axis during operation, in an automatic free-curved-surface-forming grinding system.

BACKGROUND OF THE INVENTION

Several optical noncontacting detecting means have been proposed as follows:

(1) Traditional means to introduce the motion of the real image of a light spot in the direction of optical axis or that perpendicular thereto through a slit or a screen to a photocell.

(2) Means providing a vibrating pinhole where the real image of a light spot is formed so that the image displacement in the direction in which the pinhole vibrates be determined from the difference in phase between the vibration of the pinhole and the variation in the intensity of the light passing therethrough (known as the pinhole vibration method).

(3) Means giving an oblique observation relative to the axis of light projection so that the displacement of a light spot in the direction of the light projection axis on the surface being detected be converted as the lateral motion of the image, from which differential output is obtained through two photocells provided directly over the plane where the image is formed.

(4) Means directly measuring the displacement in the surface being detected by trigonometry based on a reference length established within the detector (such as the detector utilizing phase difference between incident and reflected wave, and the detector with rotary mirror).

However, these conventional detecting means have encountered several problems, such as a low signal/noise (S/N) ratio with weak signal input, a complex lay out of optical system, and an increase in apparatus size and weight. Particularly, the means (4) cannot utilize a change in the intensity of the light as the varying quantity for detection, because the intensity of input signal light is strongly affected by the direction of the normal at the surface of the object being detected. Therefore, it is difficult to provide a versatility such as a function to detect normal directions of the surface of the object simultaneously or independently.

The object of this invention is to solve these problems with the conventional detecting means by providing an optical noncontacting detector that comes with a high S/N ratio, simple optical system, small size, light weight, solidly built and applicability to wide use.

SUMMARY OF THE INVENTION

It is a feature of this invention that the optical noncontacting detector according thereto comprises a light projecting system that sends forth light through a lens barrel to the surface of an object to be detected which is positioned in front of the lens barrel, a light receiving system that receives the light from the surface of the object through the lens barrel, a shielding pipe fixed along the central axis of the lens barrel to shield the projecting light from the light to the light receiving system, a front end of which faces the surface to be detected, condensing means (such as converging lens) disposed in a front part of the lens barrel, and reflecting means disposed around the shielding pipe axis-symetrically with respect to the central axis of the lens barrel. The light source of the light projecting system is provided in one of that part of the lens barrel which faces the reflecting means or that part thereof which faces the base end of the shielding pipe to correspond with the position of the light source, the light receiving means of the light receiving system in the other part or vice versa (position exchangeability of the light source and the receiving means is an important feature considering the reciprocity principle of light progress).

It is another feature of this invention that the optical noncontacting detector according thereto comprises a light source provided in the rear part of the lens barrel, a shielding pipe fixed along the central axis of the lens barrel to propagate the light from the light source to the surface of the object to be detected and also the front end of the pipe passes through the center of the converging lens, a converging lens disposed coaxially with the shielding pipe in the front part of the lens barrel, reflecting means that is the external surface of the shielding pipe to reflect the light focused by the converging lens, and the light receiving means consisting of two elements, the first element of which is disposed coaxially with the shielding pipe in front of the reflecting part of the pipe and has a circular hole in the center so as to make an annular opening with the pipe that passes a certain portion of light from the converging lens to the reflecting means and the second element which is disposed coaxially with the shielding pipe at the back of the reflecting means and the outputs of these two elements are to be connected to a differential DC amplifier.

It is still another feature of this invention that the optical noncontacting detector according thereto comprises a multitude of photofibers, which have a light receiving end to receive the light from the reflecting means and transfer the light to the detecting system, densely disposed around, and parallel to, the central photofiber which performs as shield pass of the projecting light.

Furthermore, it is another feature of this invention that the optical noncontacting detector according thereto comprises a light receiving member with enlarged solid angle, with a concave surface opening to the surface of the object to be detected, provided in the front part of the lens barrel and reflecting means on the external surface of the front end of the photofibers which projected into a space within the concave surface of the light receiving member.

BRIEF DESCRIPTION OF THE DRAWINGS

FIG. 1 schematically illustrates how an object reflects light.

FIG. 2 is a longitudinal cross section showing the basic construction of the optical noncontacting detector of this invention.

FIG. 3 is a cross section looking in the direction of the arrow III—III in FIG. 2, showing how photocells are arranged.

FIGS. 4 through 12 show an optical noncontacting displacement detector which is a first embodiment of this invention.

FIG. 4 is a longitudinal cross section of the detector which is developed for exclusive use of displacement detecting.

FIG. 5 schematically illustrates the arrangement of the component parts thereof and how they work when the object surface is displaced.

FIG. 6 is an electric circuit diagram showing the signal processing circuit thereof.

FIG. 7 is an overall system block diagram as an example, when the detector is applied to a wheel wear compensator in a free-curved-surface-grinding system.

FIGS. 9 through 11 show the no-load electromotive force characteristics of the outputs of the photocells with the differential output of them.

FIG. 12 shows an example of the step response characteristic obtained by following up the surface of a grinding wheel (A24QB) with the detector driven by a pulse motor and screw system.

FIG. 13 is a longitudinal cross section of the detector.

FIG. 14 is a transverse cross section looking in the direction of the arrow along section line XIV—XIV of FIG. 13.

FIG. 15 is a longitudinal cross section of the detector.
FIG. 16 is a perspective view schematically showing the arrangement of light receiving elements therein.

DESCRIPTION OF THE PREFERRED EMBODIMENTS

Figure 1:
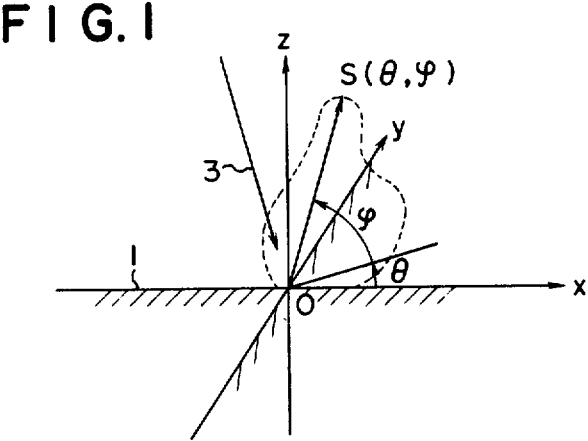
FIGS. 1 through 3 illustrate the detecting principle of the optical noncontacting detector according to this invention.

Before describing the preferred embodiments of this invention, a general principle of detection according to this invention will be explained first by reference to FIGS. 1 through 3.

Let's assume that thin parallel light beams 3 hit a point 0 at the surface of an object 1 with a relatively small curvature. (Actually, the beams hit a small area in the vicinity of the point 0. For the sake of simplicity, however, such a small area is treated here as a point.) Usually, the light produces a luminous intensity distribution S $(\theta,\phi)$ of regular and scattering reflections with diffusion, which depends upon the geometrical and physical properties of the surface.

S $(\theta,\phi)$ is a vector having a magnitude which is a measurement of any physical quantity of light [such as intensity, quantity, wavelength, and phase (in the case of pulse light, those included therein)], with direction $(\theta,\phi)$.

Naturally, this distribution of reflected light include such information as the heterogeneity resulting from the position of the irradiation point 0, direction and roughness of the surface, etc., and the anisotropy in surface configuration and the like.

Figure 2:
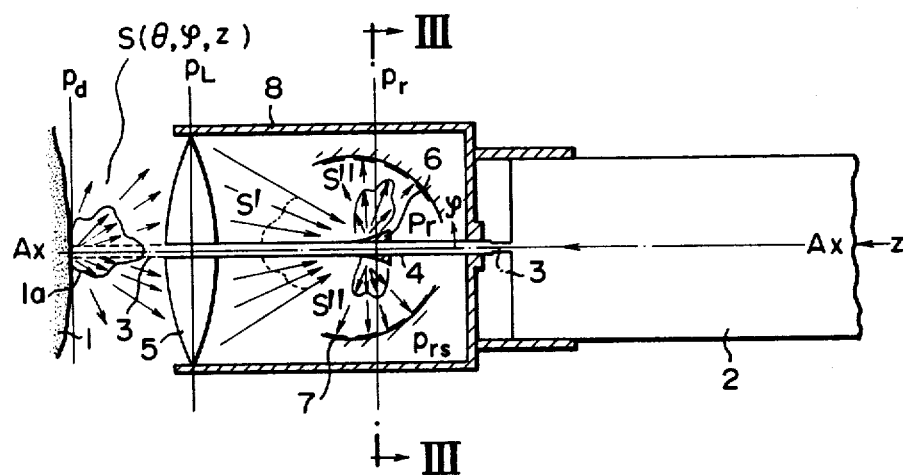

Of this distribution, some portion [S"$(\theta,\phi)$, see FIG. 2] needed to achieve the desired detection is selected, which is then appropriately processed for the evaluation according to the aims of the detecting.

Figure 3:
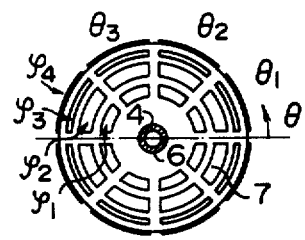

Referring now to FIGS. 2 and 3, how the detection is accomplished will be described in order.

(1) The detector has two main systems, that is a light projecting system which sends forth light from within a lens barrel 8 to the surface to be detected $p_d$ of an object 1 standing in front of the lens barrel 8 and a light receiving system which receives the light from the surface $p_d$ of the object 1 through the lens barrel 8 share a common axis Ax (or z). A shielding pipe 4 (which consists of a thin metal pipe or a photofiber and lod lens) to separate the light cast by the light projecting system and the light received by the light receiving system is disposed on the central axis of the lens barrel 8 which coincides with the axis Ax. The front end of the shielding pipe 4 passes through a light gathering system (consisting of a convex converging lens 5), facing the surface $p_d$ of the object 1.

(2) The spotlight thrown upon the surface $p_d$ through the shielding pipe 4 produces a distribution of reflected light S $(\theta,\phi,z)$ [wherein z designates the position of the image of the spotlight in direction z] which is converged by the light gathering system having the largest possible light receiving solid angle [$\theta$(ste.rad.); $\theta$max$=2\pi$]. The convex converging lens 5 with a small F value is an example of the light gathering system.

Accordingly, a converged image S' $(\theta,\phi,z)$ of S $(\theta,\phi,z)$ is formed near a reference place $p_r$ or reference point $p_r$ on the axis Ax behind the converging lens 5.

(3) A curved mirror 6 (curved axis-symmetrically with respect to the axis Ax, for example, like the external surface of a cylinder, circular cone, convex or concave body of rotation), a number of flat mirrors arranged axis-symmetrically, or other type of mirror (with surfaces, for example, of a polygonal prism, pyramid, or other polyhedrons having flat or curved surfaces) is provided as reflecting means, whereby the converged image S' $(\theta,\phi,z)$ of the spotlight is converted to a $\theta$-r luminous intensity distribution S" $(\theta,r)$ on the reference plane $p_r$ or a $\theta$-$\phi$ luminous intensity distribution S" $(\theta,\phi)$ on a curved surface $p_{rs}$ near the reference point $p_r$. Here, r designates a coordinate in the direction of the radius.

(4) A group of photocells 7 [each of which being designated by reference character $p_c(\theta_n, r_m)$ or $p_c(\theta_n, \phi_m)$] constituting the light receiving means of the light receiving system, which are arranged in a $\theta$-r or $\theta$-$\phi$ matrix in the plane $p_r$ or curved surface $p_{rs}$ near the point $P_r$, detect the distribution S" $(\theta, r)$ or S" $(\theta,\phi)$ reproduced on the reference plane $p_r$ or curved surface $p_{rs}$ (in some instances, part of the image S' $(\theta,\phi, z)$ may be received for reference).

(5) The output signal Out $(\theta_n, r_m)$ or Out $(\theta_n, \phi_m)$ obtained from the group of photocells 7 is processed through a reverse transformation processing to permit the evaluation of S $(\theta, \phi, z)$, whereby the state or change of the surface $p_d$ responsible for the distribution S $(\theta,\phi,z)$ detected. In FIG. 2, reference character 2 designates a laser gun serving as the light source of the light projecting system, 3 parallel laser beams, and $p_L$ the position of a single lens equivalent to the converging lens system 5.

In an example shown in FIG. 3, the group of photocells 7 arranged in a $\theta$-$\phi$ matrix along the curved surface $p_{rs}$ consists of a total of 32 photocells $p_c$ ($\theta_n$, $\phi_m$)[n=1, 2, 3, 4; m=1, 2, 3, 4, 5, 6, 7, 8 (provided that n and m can be selected arbitrarily according to the need of resolving power)].

In the above-described detector, the laser gun 2 is positioned opposite to the base end of the shielding pipe 4, and the multitude of photocells $p_c(\theta_n, r_m)$ or $P_c(\theta_n, \phi_m)$, which make up the group of photocells 7, are disposed in the lens tube 8 opposite to the curved mirror 6 at varying angles thereto. Instead, the light source of the light projecting system may be provided opposite to the curved mirror 6 within the lens tube 8 and the light receiving means of the light receiving system opposite to the base end of the shielding pipe 4, by taking advantage of the reversibility of light. In this case, a multiplicity of discernible light sources positioned at varying angles and distances with respect to the curved mirror 6 are used as the light source of the light projecting system.

The group of indentifiable light sources (such as light emitting diods or semiconductor lasers) arranged in a $\theta$-$\phi$, $\theta$-r, or $\theta$-z matrix in the plane $p_r$ (capable of identifying the position of $\theta$-$\phi$, $\theta$-r, $\theta$-z from the pulse cycle, pulse form ratio, phase, pulse form, light wavelength, irradiation timing, and the like) permits discerning the nature of the reflected light converging to the central optical axis and, thereby, detecting the state or displacement in the surface $p_d$.

Figure 4:
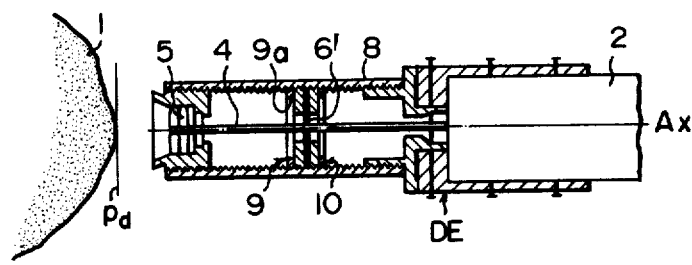
Figure 5:
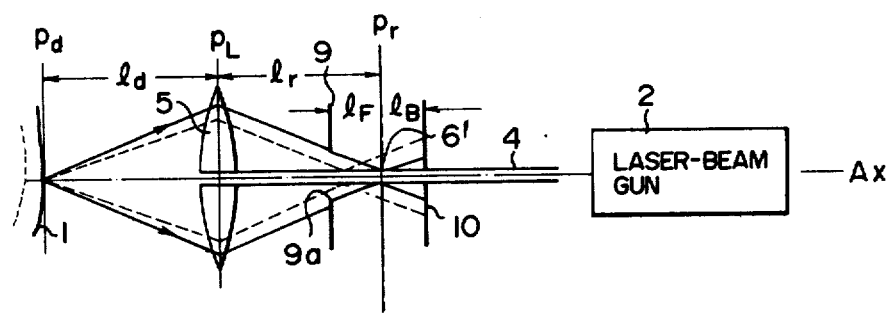
Figure 6:
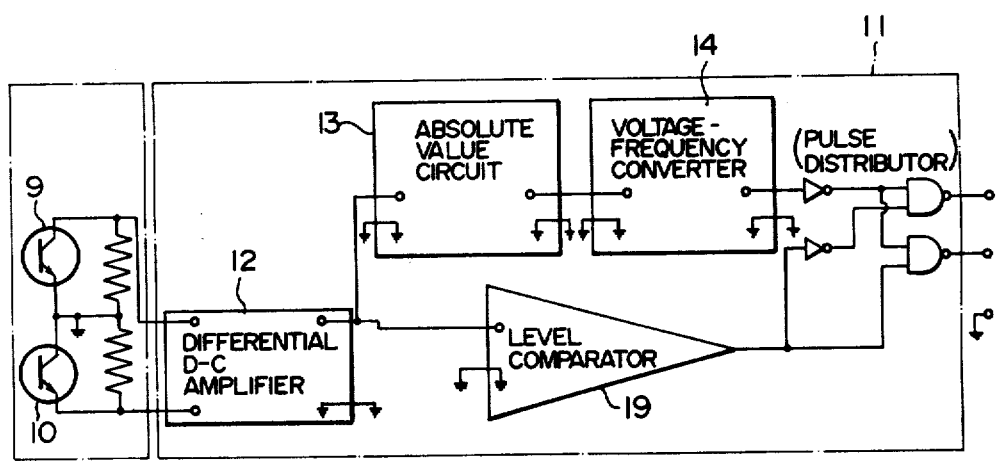
Figure 7:
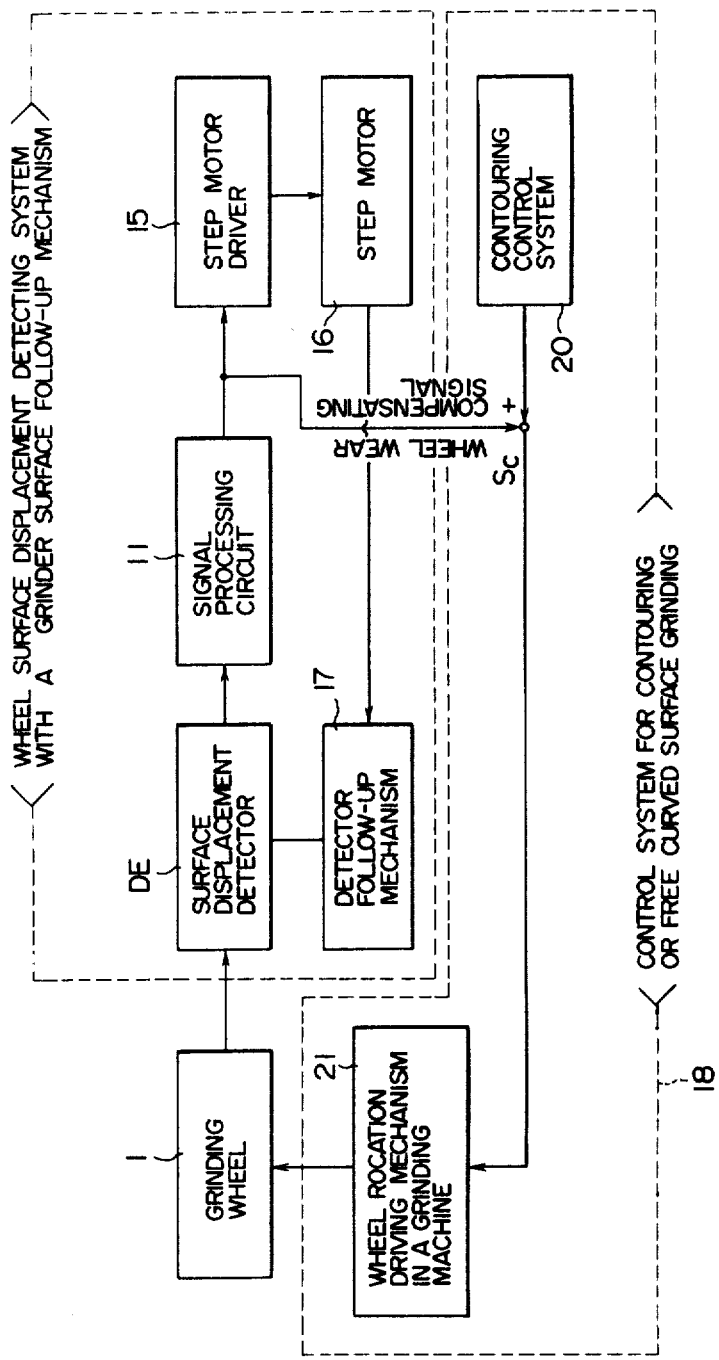
Figure 8A:
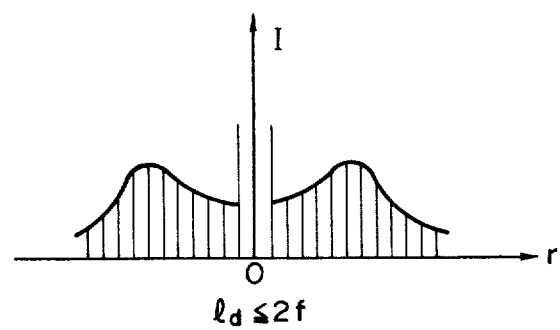
FIGS. 8(a), 8(b) and 8(c) are diaphragms schematically illustrating the intensity distributions of the light passing through the reference plane.
Figure 8B:
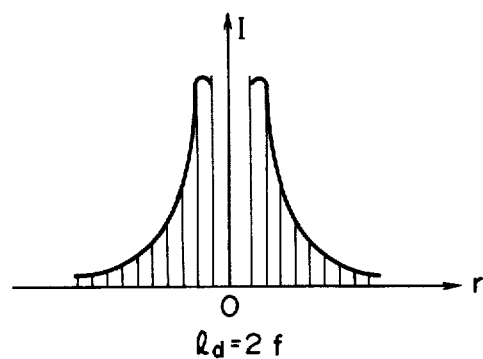
Figure 8C:
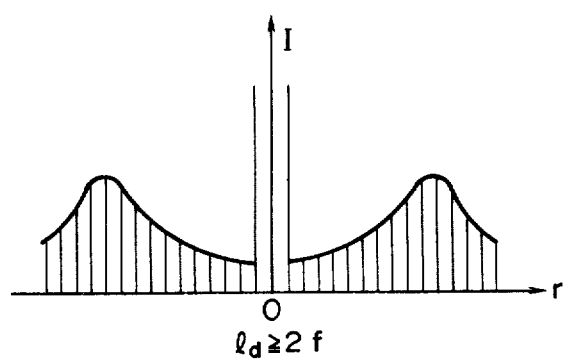
Figure 9:
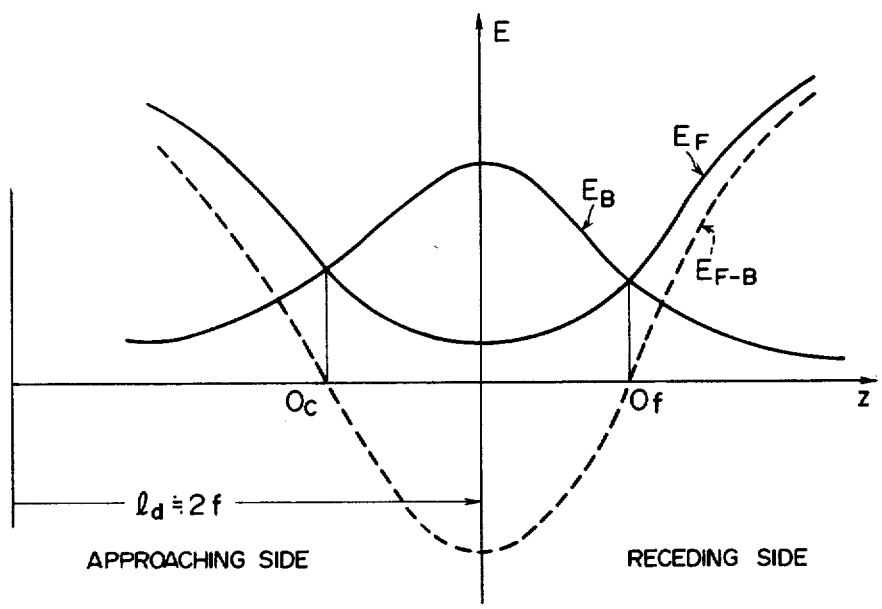
Figure 10:
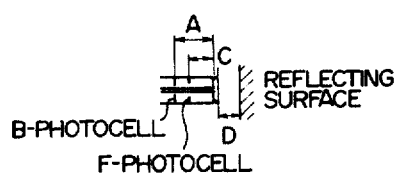
Figure 10:
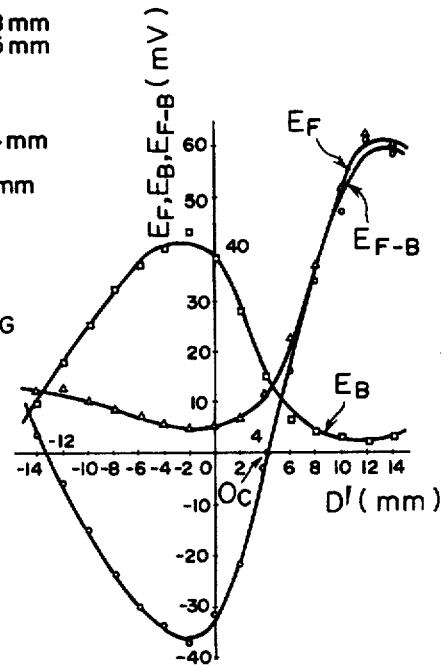
Figure 11:
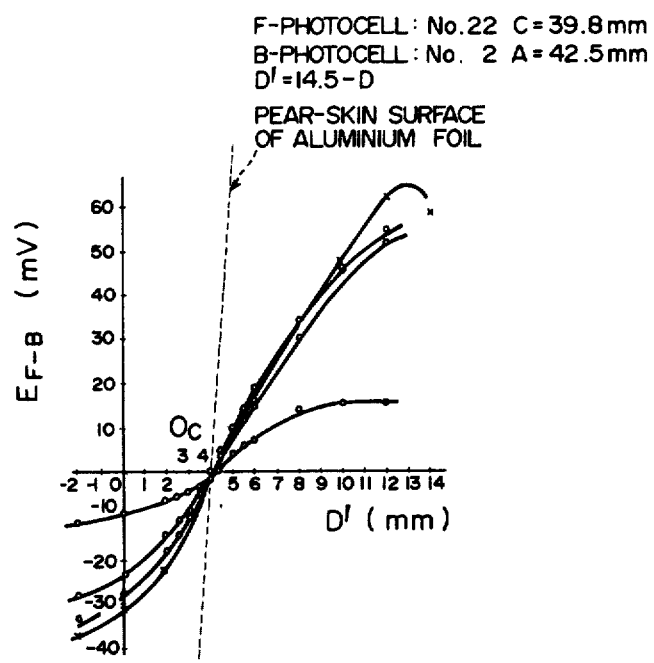
Figure 12:
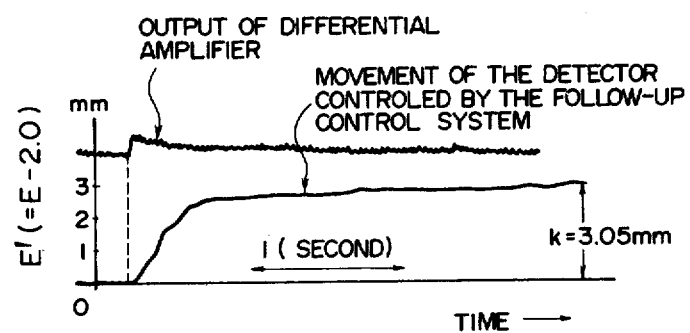

Now several embodiments of the optical noncontacting detector of this invention will be described by reference to the accompanying drawings, wherein:

FIG. 4 is a longitudinal cross section of a first embodiment which is developed for exclusive use of displacement detecting. FIG. 5 schematically illustrates the arrangement of the component parts thereof and how they work when the object surface is displaced. FIG. 6 is an electric circuit diagram of the signal processing circuit thereof. FIG. 7 is a block diagram showing the entire system thereof as an example, when the detector is applied to a wheel wear compensator in a free-curved-surface-grinding system. FIGS. 8(a), 8(b) and 8(c) show schematically the intensity distributions of the light passing through the reference plane. FIGS. 9 through 11 show the no-load electromotive force characteristics of the outputs of the photocells with the differencial output of them. FIG. 12 shows an example of the step response characteristic obtained by following up the surface of a grinding wheel (A24QB) with the detector driven by a pulse motor and screw system.

The first embodiment is an optical noncontacting detector developed for exclusive use for displacement detecting in direction z (or Ax) of an object (grinding wheel 1, as an example). As shown in FIG. 4, a laser-beam gun 2, which is the light source of the light projecting system, is attached to the rear end of a lens barrel 8 which constitutes the main body of a detector DE.

A shielding pipe 4 is fixed along the central axis of the lens tube 8 (the central axis Ax coinciding with the axis of the light projecting system and that of the light receiving system). The shielding pipe 4 is disposed so that the base end thereof lies opposite to the laser gun 2, the middle part passes through the lens tube 8, and the front end lies opposite to the surface $p_d$ of the grinding wheel 1 placed in front of the lens barrel 8 for detection.

Accordingly, the parallel beams emitted from the laser gun 2 are propagated through the shielding pipe 4 on to the surface $p_d$ to form a circular light spot thereon.

A condenser 5, consisting of a number of lenses, is fitted in the front part of the lens tube 8 coaxially with the shielding pipe 4, with the front end of the shielding pipe 4 passing through the center of the condenser 5.

To detect the light from the condenser 5, light receiving means are provided which comprises F-photocell 9, which is the first light receiving element, and B-photocell 10, which is the second light receiving element, each comprising a silicon photocell of disctype with a hole at the center.

The F-photocell 9 is set in front of that part of the external wall 6' of the shielding pipe 4 which serves as a reflecting part, coaxially with the shielding pipe 4. The F-photocell 9 has a circural hole in the center as be make an annular opening 9a with the pipe 4 through which a portion of light from the condenser 5 passes to the reflecting part 6'.

The B-photocell 10 is set behind the reflecting part 6' coaxially with the shielding pipe 4. The photocell 9 and 10 are connected to a differential amplifier 12 in a signal processing circuit 11 which makes up the detecting system, as shown in FIG. 6.

The reflected light from the surface $p_d$ coming within a certain light receiving solid angle, which depends on the F value of the condenser 5, is converged by the condenser 5 positioned at $p_L$, as shown in FIG. 5. The F-photocell 9 directly receives the converged light, while the B-photocell 10 receives such part of the converged light that passes through the annular opening 9a in the F-photocell 9 and reflects from the reflecting part 6'. The differential amplifier 12 produces an output proportional to the difference between the outputs from the photocell 9 and 10.

The output characteristics (no-load electromotive forces) produced by the F and B photocells 9 and 10 when receiving the converged light vary with the distance $l_F$ and $l_B$ from the surface $p_r$, the inside and outside diameters of each element, and other factors. By appropriately adjusting these variables, the outputs can be made symmetrical as shown in FIG. 9, whereupon the difference $E_{F-B}(=E_F-E_B)$ between the outputs of the photocells 9 and 10 too becomes symmetrical as indicated by a broken line in the same figure.

In practical application, the differential output near the zero point $O_c$ on the approaching side is utilized for detection.

By appropriately adjusting the distance $l_F$ and $l_B$ from the surface $p_r$, asymmetrical output characteristics favorable to the approaching side can be obtained, too (FIG. 10).

FIG. 10 shows the characteristic of the no-load voltage E (mV) resulting from an arrangement in which the circumferential surface of the stationary grinding wheel 1 is the surface to be detected $p_d$, the distance between $p_L$ and $p_r$ equals about two times of f (where f is the focal distance of the condenser 5), and the F and B photocells 9 and 10 are located at the position having distance of 3.2 mm and 1.5 mm, respectively, from the reference plane $p_r$, toward the condenser 5, that is, ($l_F=-3.2$ mm, and $l_B=-1.5$ mm).

In FIG. 10, the approaching side is where D' is positive, while the receding side is where D' is negative.

The f and F values of the condenser 5 are 16 mm and 1:1.6, respectively.

FIG. 11 shows the characteristic of the no-load voltage (output) obtained by throwing the spotlight on arbitrarily selected points on the same wheel.

The characteristic curves show that different points produce different outputs because of the varying amounts of irregular reflection, nevertheless also show that the point $O_c$ ($D' = 4.1$ mm) where the differential output becomes zero is extremely stable.

The fact that the zero point $O_c$ is so stable is favorable for the follow-up control of the detector DE that is performed by keeping the detector DE away from the surface $p_d$ at a constant distance as described later. Namely, this permits continuous measuring of the surface $p_d$ of the grinding wheel 1.

As shown in FIGS. 6 and 7, outputs from the F and B-photocells 9 and 10 of this detector DE are applied to the differential amplifier 12 of the signal processing circuit 11. The output from the differential amplifier 12 is supplied through an absolute value circuit 13 to a voltage-frequency (V-F) converter 14, where a voltage-frequency converting processing is given with the ratio $K \approx 500$ Hz/mm, then to a step motor driving circuit 15 to drive a step motor 16.

The level comparator 19 detects the sign of the differencial output, then controls the pulse distribution, so that the direction of the step motor's revolution be controled.

The voltage-frequency conversion given by the V-F converter 14 provides such a frequency range that the pulse motor 16 can start by itself.

The step motor 16 thus driven actuates the detector surface follow-up mechanism 17 which comprises a guide, screw, and the like. Such a feedback system causes the detector DE to travel over the surface $P_d$ keeping a constant distance from the surface $P_d$.

FIG. 12 shows an example of step response to a 2 mm step displacement (procedures; during follow-up attained switching the laser beam off, then giving 2 mm displacement and switching laser beam on to start). Evidently, it takes approximately 0.3 second to reach 63.2 percent of the aimed-for value (2 mm). The total number of pulses necessary for achieving zero reset to the pulse motor system is proportional to the displacement of the surface $P_d$ under observation (ratios $\approx 250$ p/mm). Therefore, the pulse signal from the signal processing circuit 11 can be supplied direct to a curved-surface or contour grinding control system 18 as a wheel wear compensating signal $S_c$, unless the step motor 16 fails to operate properly (FIG. 7).

Reference numeral 20 in FIG. 7 designates a contour follow-up control system for copying or numerical control, and 21 a wheel location driving mechanism of the grinding machine.

To detect the displacement of the surface $p_d$ of the grinding wheel 1, the optical noncontacting detector DE with the wheel surface follow-up mechanism 17 is positioned opposite thereto.

Then, the laser gun 2 irradiates the parallel light beams 3 from the front end thereof through the shielding pipe 4 to the surface $p_d$. The irradiated parallel light beams 3 are reflected by the surface $p_d$, converged by the condenser 5, and received by the F and B photocells 9 and 10.

The signal processing circuit 11 applies a voltage-frequency conversion to the differential output proportional to the difference between the outputs from the F and B photocells 9 and 10. Then, the resulting frequency is supplied to the pulse motor driving circuit 15 to drive the pulse motor 16.

The wheel surface follow-up mechanism 17 thus driven provides a follow-up control so that the detector DE travels over the surface $p_d$ keeping a constant distance.

At the same time, the signal processing circuit 11 supplies the wheel wear compensating signal $S_c$ to the output side of the contour follow-up control system 20, which drives the wheel location driving mechanism 21 of the grinding machine to control the location of the grinding wheel 1.

This first embodiment is used for detecting the displacement in direction z only. Therefore, all information other than the displacement in direction z are regarded as disturbance.

The following paragraphs briefly describe how the construction of the regular detector (FIG. 2) discussed previously is modified to obtain this specific variation suited for the detection of the z-oriented displacement alone.

The reflecting means at the reference point $p_r$ in FIG. 2 is now a cylindrical mirror, and the curved surface $p_{rs}$ to receive the reflected light is a circular plane which corresponds to the entire surface of the single B-photocell.

The F-photocell receives a part of $S'$ ($\theta$, $\phi$, z) for reference.

For both F and B photocells, the number of element partitions (or the numbers of elements) n and m with respect to the coordinate ($\theta$, r) or ($\theta$, $\phi$) or ($\theta$, z) in the reference space have the relationship $n = m = 1$. By comparing the part of S', received for reference with S'' (with $n = m = 1$), this specific detector draws only such information as concerns displacement in the direction z out of S ($\theta$, $\phi$, z).

If the F-photocell is removed, the B-photocell is divided with respect to either ($\theta$, r) or ($\theta$, $\phi$) like the curved surface $p_{rs}$, and n and m are made plural, this specific variation will return to the regular type. The output, when $n = 1$ with respect to $\theta$ must be identical with the sum total of outputs, when $n = 2$ or larger. By making $m = 2$ and comparing element outputs $$\sum_{n=1}^{n} E(\theta_n, r_{m=1}) \text{ and } \sum_{n=1}^{n} E(\theta_n, r_{m=2}),$$

a z-oriented detection similar to that attained by the first embodiment can, of course, be achieved.

It is also possible to use a group of photocells arranged in an appropriate matrix (such as $\theta$-$\phi$ and $\theta$-r), as the F and B photocells 9 and 10 in the first embodiment, so that the direction of the normal, configuration anisotropy and such at the surface be detected simultaneously.

FIGS. 8(a), 8(b) and 8(c) schematically show the intensity distribution of the light passing through the reference plane $p_r$ in FIG. 5, in terms of the coordinate r-$\theta$ in the plane $p_r$. As seen, the distribution of light intensity varies with the distance $l_d$ between $p_d$ and $p_L$ while the distance $l_r$ between $p_r$ and $p_L$ is fixed at approximately 2 f.

FIGS. 8(a), 8(b) and 8(c) show that the summing-up distribution of the converged light S' and the reflected light S'' is uniform in the direction of $\theta$, when they are axis-symmetrical with respect to the axis Ax (or z).

The distribution of light intensity or the magnitude of change relative to $\Delta l_d$ varies with the radius $r_m$ of the cylindrical mirror, F value of the condenser 5, and the distance $l_r$ between $p_r$ and $p_L$. Therefore, a double circular photocell element or a group of such elements placed in the plane $p_r$ can yield a similar characteristic of differential output as in the first embodiment.

In the first embodiment, the shielding pipe 4 separates the lights of the light projecting and receiving systems so as not to cause mutual interference, while providing the common axis to the two systems. This arrangement permits reducing the size and weight of the detector while increasing the S/N ratio.

If the light receiving means is made up of a group of photocell elements arranged in a predetermined matrix (such as the $\theta$-r or $\theta$-$\phi$ matrix), the direction of normal, configuration anisotropy, and the like in the surface of the object $p_d$ too can be detected at the same time, which gives the detector multiple uses.

Figure 13:
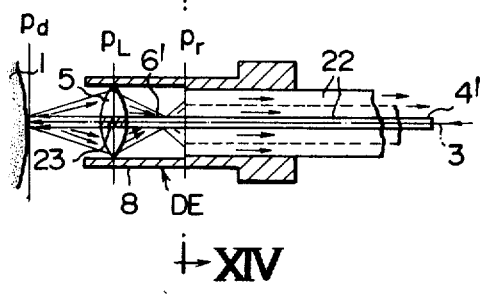
FIG. 13 and 14 show an optical noncontacting detector which is a second embodiment of this invention.
Figure 14:
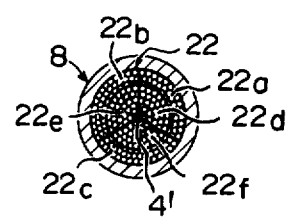

FIGS. 13 and 14 show an optical noncontacting detector which is a second embodiment of this invention. FIG. 13 is a longitudinal cross section of the detector. FIG. 14 is a transverse cross section looking in the direction of the arrow XIV—XIV in FIG. 13. In FIGS. 13 and 14, similar reference numerals designate substantially the same parts as in FIGS. 1 through 12.

The second embodiment has a group of photofibers 22, each of which has a light receiving end opening to the reference plane $p_r$ to receive the light from the reflecting part 6' and guides the received light to the light receiving element and signal processing circuit making up the detecting system. A multiplicity of photofibers, which make up the photofiber group 22, are densely disposed around, and parallel to, a central photofiber 4' that has a shielding function.

The photofiber group 22 consists of six subgroups 22a, 22b, 22c, 22d, 22e and 22f; namely, the group 22 can be divided into an external and internal subgroup, each of which is then circumferentially divided into three subgroups. Each photofiber subgroup has different r and $\theta$ number in the matrix.

Insertion of this threefold photofiber group, including the central photofiber 4', in the lens barrel 8 permits putting the light source, light receiving element and processing unit in a quiet, disturbance-free area away from the detecting field, sometimes too rough for such instruments, reducing the size and weight and increasing the rigidity of the device, and thereby enhancing the stability and the reliability of detection achieved.

Reference numeral 23 in FIG. 13 designates a selfoc lens (or a converging rod lens) attached to the front end of the central photofiber 4' in order to cast pseudo-paralell light to the surface $p_d$.

As in the case of the first embodiment, this second embodiment too is capable of detecting the surface displacement of the surface $p_d$. The second embodiment is also capable of detecting the direction of normal and form anisotropy of the surface to a certain extent.

In the foregoing embodiment, light from the light source is thrown through the central photofiber 4' onto the surface of the object 1, then the reflected light is received through the condenser 5 and reflecting part 6'. Instead, identifiable lights from the light source may be thrown through the photofiber group 22 and condenser 5 onto the surface of the object 1 so that the reflected light be received through the central photofiber 4', by taking advantage of the reciprocity of light progress.

This variation offers substantially the same effects and advantages as those obtained from the foregoing embodiment.

Figure 15:
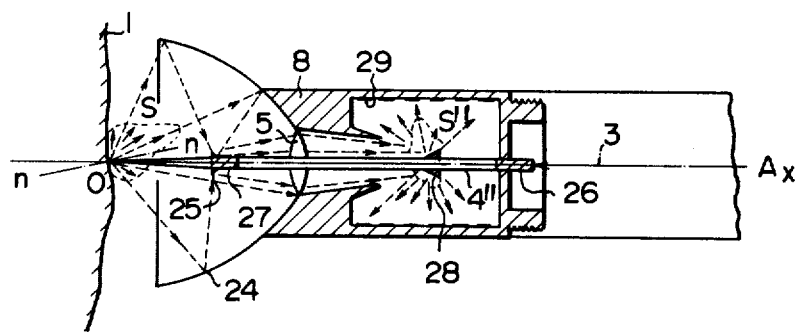
FIGS. 15 and 16 show another optical noncontacting detector which is a third embodiment of this invention.
Figure 16:
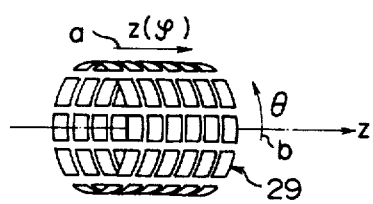

FIGS. 15 and 16 show an optical noncontacting detector which is a third embodiment of this invention. FIG. 15 is a longitudinal cross section of the detector. FIG. 16 is a schematic perspective view showing the arrangement of the photocell elements thereof. In FIGS. 15 and 16, similar reference numerals designate substantially the same parts as in FIGS. 1 through 14.

This third embodiment, which is capable of increasing the light receiving solid angle $\theta_{st}$, is effectively applicable to the detection of the direction of normal and configuration anisotropy of the surface.

To detect the $\theta$ and $\phi$ distribution of the irregular reflection from the surface under observation, it is desirable that the light receiving solid angle $\theta_{st}$ be as large as possible (maximum $\theta_{st} = 2\pi$) and the light spot diameter as small as possible.

The third embodiment has a mirror 24 with an ellipsoidal surface of revolution in the front part of the lens barrel 8. The mirror 24 opens to the surface of the object 1 to increase the light receiving solid angle.

The front end of a photofiber 4" projects into a concave space defined by the ellipsoidal surface of revolution of the mirror 24. A second reflecting part 25 is provided around the projecting front end of the photofiber, whereby the light received by the mirror 24 is efficiently reflected to the condenser 5.

Directly or through a selfoc type photofiber etc., light is thrown from a laser gun through a selfoc lens 26, photofiber 4", and a selfoc lens 27 onto an observation point O on the surface of the object 1 to form a light spot (having the size and intensity suited for the object and range of measurement. For detecting the direction of normal n, it is theoretically preferable that the diameter of the light spot be as small as possible, so far as surface roughness permits. For detecting the surface configuration anisotropy, however, the diameter must be held within a suitable limit.) The reflected light is received by the mirror 24, then reflected by the second reflecting part 25 on the front end of the photofiber, and converged by the condenser 5.

The light thus gathered by the condenser 5 is reflected by an aspherical mirror 28, around the photofiber 4" in the lens barrel 8, then received by a group of light receiving elements 29 which are disposed along the inside wall of the lens barrel 8 in the z or $\phi$ matrix in the direction indicated by the arrow a and in the $\theta$ matrix in the direction indicated by the arrow b, then, processed by an apropriate signal processing system for necessary evaluation.

There should exist no linear relationship between the $\theta$-$\phi$ light intensity distribution S around the point O and the $\theta$-$\phi$ or $\theta$-z distribution of the output obtained by the light element group 29. By comparing the output with respect to $\theta$ and $\phi$, however, detection of the direction of normal n can be accomplished within a certain limit.

If an attitude control is given to turn the axis Ax of the detector about the point O in the direction $\phi$ so that the output of the elements in the $\theta$ matrix are balanced while giving a control to maintain a constant distance from the point O [which can be attained by comparing the outputs of the element groups having different z (or $\phi$) matrices], then the resulting Ax becomes oriented in the same direction as n. This permits determining the direction of normal with a fewer number of elements.

The embodiment in FIGS. 15 and 16 can detect ridges and other configuration anisotropies as it is. When used exclusively for such detection, however, simpler element arrangement is possible.

This third embodiment not only offers substantially the same effects and advantages as those of the foregoing embodiments, but also assures exact detection of the direction of normal and configuration anisotropy of the surface of the object because of the increased light receiving solid angle.

By taking advantage of the reciprocity of light progress, identifiable light from the light source may be thrown, in the third embodiment too, on the surface of the object 1 through the reflecting part 28, condenser 5, second reflecting part 25, and curved mirror 24 so that the reflected light be received through the photofiber 4".

Instead of the curved mirror 24 used in the above-described embodiments, a group of ommatidial lenses or pin-holes may be used to add characteristic functions or features to permit more direct detection of S ($\theta$, $\phi$).

Also, the light from the light source need not be limited to the parallel beams, but also may be converged or diffused by a selfoc lens. The shape of the beam spot too may be circular, polygonal or otherwise, depending on the object of detection.

As will be understood from the above, the optical noncontacting detector according to this invention offers the following effects and advantages:

(1) Because the light projecting and receiving systems share a common axis and the lights of the two systems do not interfere with each other, the detector of this invention has a higher S/N ratio and smaller size and weight than conventional ones.

(2) With the ability to detect S ($\theta$, $\phi$, z), namely, the displacement, direction of normal, and configuration anisotropy of the surface of the object, the detector of this invention has wider uses than many of conventional displacement detectors that can detect only S (z).

(3) Composed of stationary parts alone, the detector of this invention has higher rigidity, stability and maintainability as well as longer service life.

(4) Provision of densely packed photofibers around a shielding pipe (central photofiber) not only makes the detector smaller and stronger, but also permits putting the light source and light receiving elements in a separate, more advantageous place, thereby increasing the reliability of detection.

(5) It is easy to apply a follow-up control to the detector of this invention which permits continuous measurement of displacement of the surface under observation.

(6) The detector of this invention can provide a substantially semispherical light receiving solid angle which permits detecting the direction of normal and configuration anisotropy of the surface with high reliability.

What is claimed is:

1. In an optical noncontacting detector for detecting the roughness of a surface such as ridges and grooves thereon comprising, a light-projecting system for radiating a beam of light on a surface the roughness of which is to be detected and having a tubular barrel having an open front end through which said beam of light is emitted, an elongated light-transmitting means coaxial with the tubular barrel for transmitting the beam of light out of the open end of the tubular barrel without dispersion of light internally of the tubular barrel, a source of light emitting and transmitting said beam of light through said light-transmitting means, a light-receiving system having light-gathering means on said tubular barrel for gathering into the tubular barrel light rays reflected from said surface when said beam of light radiates said surface and having means for converging reflected light rays at an area of reference internally of said tubular barrel, and said light-receiving system comprising reflected-light transmitting means disposed in said tubular barrel outside of said light-transmitting member and shielded therefrom and symmetrically about the longitudinal axis of said tubular barrel for receiving the reflected light rays and converting them into a selected distribution for eventual transducing thereof.

2. In an optical non-contacting detector for detecting the roughness of a surface such as ridges and grooves thereon according to claim 1, in which said light-gathering means comprises a lens at the front end of the tubular barrel, and said reflected light-transmitting means comprises a mirror system.

3. In an optical non-contacting detector for detecting the roughness of a surface such as ridges and grooves thereon according to claim 2, including light detectors for detecting the reflected light from said reflected light-transmitting means for transducing thereof to electrical signals.

4. In an optical non-contacting detector for detecting the roughness of a surface such as ridges and grooves thereon, according to claim 3, including an electrical processing system for processing the electrical signals.

5. In an optical non-contacting detector for detecting the roughness of a surface such as ridges and grooves thereon according to claim 1, in which said light-transmitting means is a shielding tube.

6. In an optical non-contacting detector for detecting the roughness of a surface such as ridges and grooves thereon according to claim 1, in which the light-transmitting means is a light-transmitting fiber, and in which said reflected-light transmitting means comprises a plurality of light-transmitting fibers.

7. In an optical non-contacting detector for detecting the roughness of a surface such as ridges and grooves thereon according to claim 1, in which the light gathering means comprises a condenser lens.

8. In an optical non-contacting detector for detecting the roughness of a surface such as ridges and grooves thereon, according to claim 1, in which said light-transmitting means comprises a rod lens and in which said light-receiving means comprises a plurality of fibers coaxial with said rod lens and disposed circumferentially about said rod lens.

9. In an optical non-contacting detector for detecting the roughness of a surface such as ridges and grooves thereon according to claim 1, in which said light-transmitting means comprises a shielded photofiber, and in which the light-receiving means comprises a bundle of photofibers coaxial with said shielded photofiber and disposed circumferentially about said shielded photofiber.

10. In an optical non-contacting detector for detecting the roughness of a surface such as ridges and grooves thereon according to claim 1, in which the reflected light transmitting means comprises the outer walls of the light-transmitting means.

11. In an optical non-contacting detector according to claim 10, in which said light-transmitting means is a tube.

* * * * *